(12) United States Patent
Prakah-Asante et al.

(10) Patent No.: US 9,969,403 B2
(45) Date of Patent: May 15, 2018

(54) METHOD AND APPARATUS FOR PREDICTIVE DRIVING-MODE LEARNING AND ENABLEMENT

(71) Applicant: Ford Global Technologies, LLC, Dearborn, MI (US)

(72) Inventors: Kwaku O. Prakah-Asante, Commerce Township, MI (US); Hsin-hsiang Yang, Ann Arbor, MI (US); Fling Tseng, Ann Arbor, MI (US); Steven Joseph Szwabowski, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 218 days.

(21) Appl. No.: 14/529,704

(22) Filed: Oct. 31, 2014

(65) Prior Publication Data

US 2016/0121904 A1    May 5, 2016

(51) Int. Cl.
*B60W 50/00*        (2006.01)
*B60W 50/08*        (2012.01)

(52) U.S. Cl.
CPC ........ *B60W 50/00* (2013.01); *B60W 50/0098* (2013.01); *B60W 50/08* (2013.01); *B60W 2050/0089* (2013.01); *B60W 2550/12* (2013.01); *B60W 2550/20* (2013.01); *B60W 2550/402* (2013.01)

(58) Field of Classification Search
CPC .............................. B60W 50/00; B60W 50/08
USPC .......................................................... 701/1
See application file for complete search history.

(56) References Cited

U.S. PATENT DOCUMENTS

| | | | | |
|---|---|---|---|---|
| 7,177,729 | B2 * | 2/2007 | Fukui | B60K 35/00 180/65.1 |
| 8,145,402 | B2 | 3/2012 | Craig | |
| 2007/0032913 | A1 * | 2/2007 | Ghoneim | B60W 30/16 701/1 |
| 2009/0262239 | A1 * | 10/2009 | Cho | H04N 7/0122 348/445 |
| 2011/0196555 | A1 * | 8/2011 | Hennings | B60K 6/52 701/22 |
| 2013/0096751 | A1 * | 4/2013 | Riley | B60L 3/12 701/22 |
| 2013/0136309 | A1 * | 5/2013 | Zhang | G06T 7/246 382/104 |
| 2013/0173097 | A1 * | 7/2013 | Jotanovic | G01C 21/3469 701/22 |
| 2013/0274955 | A1 * | 10/2013 | Rosenbaum | G06F 17/00 701/1 |
| 2014/0046595 | A1 * | 2/2014 | Segawa | G01C 21/34 701/541 |

(Continued)

*Primary Examiner* — Frederick M Brushaber
(74) *Attorney, Agent, or Firm* — Jennifer Stec; Brooks Kushman P.C.

(57) ABSTRACT

A system includes a processor configured to receive a vehicle location and to access driver-specific driving-mode-change data for the vehicle location. The processor is also configured to determine, based on the accessed data, if a vehicle driving-mode-change has previously occurred at the vehicle location and context a sufficient number of times to cross a predefined threshold and, if so, to automatically change a vehicle driving-mode to the driving-mode associated with the previous driving-mode-change.

15 Claims, 3 Drawing Sheets

(56) References Cited

U.S. PATENT DOCUMENTS

2015/0276420 A1* 10/2015 McGee .............. G01C 21/3469
701/118

* cited by examiner

METHOD AND APPARATUS FOR PREDICTIVE DRIVING-MODE LEARNING AND ENABLEMENT

TECHNICAL FIELD

The illustrative embodiments generally relate to a method and apparatus for predictive driving mode learning and enablement.

BACKGROUND

Adaptive drive control systems provide an improved driving experience over a variety of driving conditions. Recent developments allow for automatic selection of modes such as Sport, Normal and Comfort to meet changing road conditions, curve negotiation and undulating curves. As additional modes become available, such as snow, gravel, sand, eco, etc., automatic selection of a mode desired by an operator for current vehicle operating conditions becomes increasingly more challenging.

SUMMARY

In a first illustrative embodiment, a system includes a processor configured to receive a vehicle location. The processor is further configured to access driver-specific driving-mode-change data for the vehicle location. The processor is also configured to determine, based on the accessed data, if a vehicle driving-mode-change has sufficiently occurred previously at the vehicle location to cross a predefined threshold and automatically change a vehicle driving-mode to a driving-mode resulting from the driving-mode-change that previously occurred enough times to cross the threshold.

In a second illustrative embodiment, a computer-implemented method includes receiving a vehicle location. The method also includes accessing driver-specific driving-mode-change data for the vehicle location. The method further includes determining, based on the accessed data, if a vehicle driving-mode-change has sufficiently occurred previously at the vehicle location to cross a predefined threshold and automatically changing a vehicle driving-mode to a driving-mode resulting from the driving-mode-change that previously occurred with enough frequency to cross the threshold.

In a third illustrative embodiment, a system includes a processor configured to receive driver input indicating a vehicle-driving-mode change. The processor is also configured to receive a vehicle location and store an instance of correspondence between the vehicle-driving-mode change and the vehicle location.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
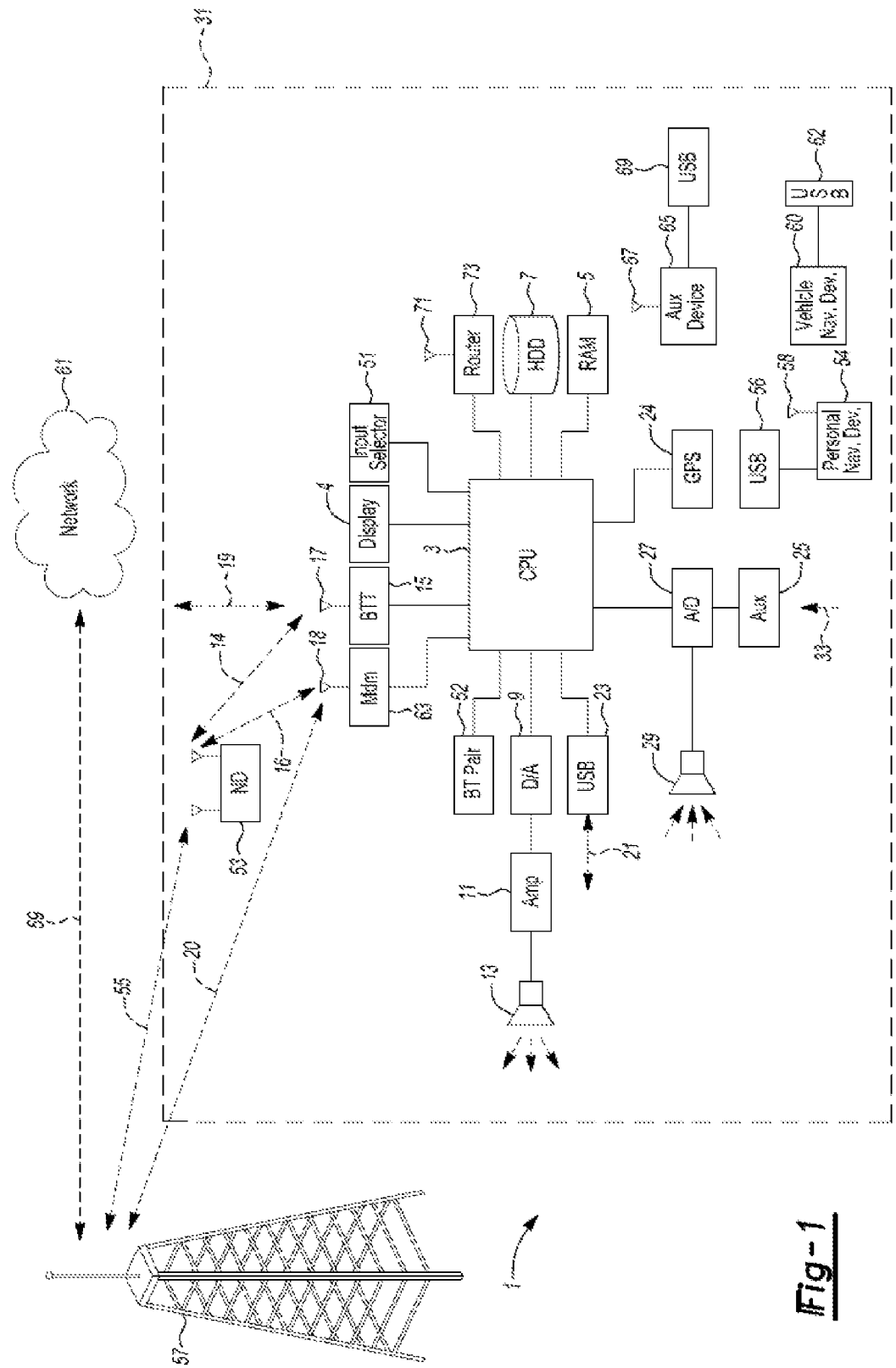
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, spoken dialog system with automatic speech recognition and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include WiFi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. These are all ITU IMT-2000 (3G) compliant standards and offer data rates up to 2 mbs for stationary or walking users and 385 kbs for users in a moving vehicle. 3G standards are now being replaced by IMT-Advanced (4G) which offers 100 mbs for users in a vehicle and 1 gbs for stationary users. If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary devices 65 may include, but are not limited to, personal media players, wireless health devices, portable computers, and the like.

Also, or alternatively, the CPU could be connected to a vehicle based wireless router 73, using for example a WiFi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

The illustrative embodiments provide exemplary systems and methods for driver choice learning for vehicle mode selection. This provides driving-mode (e.g., without limitation, sport mode, comfort mode, snow mode, gravel mode, sandy mode, fuel-eco mode, etc.) prediction and selection based on previously observed driver behavior.

In one embodiment, previous selection of a particular mode at particular locations, a sufficient number of times, may be considered indicative of a driver-intent to engage the particular mode each time that location is reached. In other embodiments, context (e.g., without limitation, passengers, weather, etc.) may be used to further refine the decision/prediction process.

Based on forecasted driver-based mode selection, the vehicle can automatically engage a driving-mode that is likely to be manually selected by the driver at a given location. This can improve both the convenience of mode selection and the driver experience. Further, if the driver is very occupied (high degree of driver attention being utilized), the predictive system can engage the mode automatically, alleviating the driver of the need to add yet another consideration to an already cluttered intellectual tableau.

The illustrative embodiments utilize recognition, selection and recordation of frequent driver mode selection, to assist in prediction of upcoming mode selection and automatic enablement of predicted modes. Regions and contextual conditions for specific mode selection can be learned over time, by fusing coordinate information, contextual information and real-time driver mode-selection. This learned data can be utilized in automatic enablement of modes at similar coordinates under similar conditions at future times.

Figure 2:
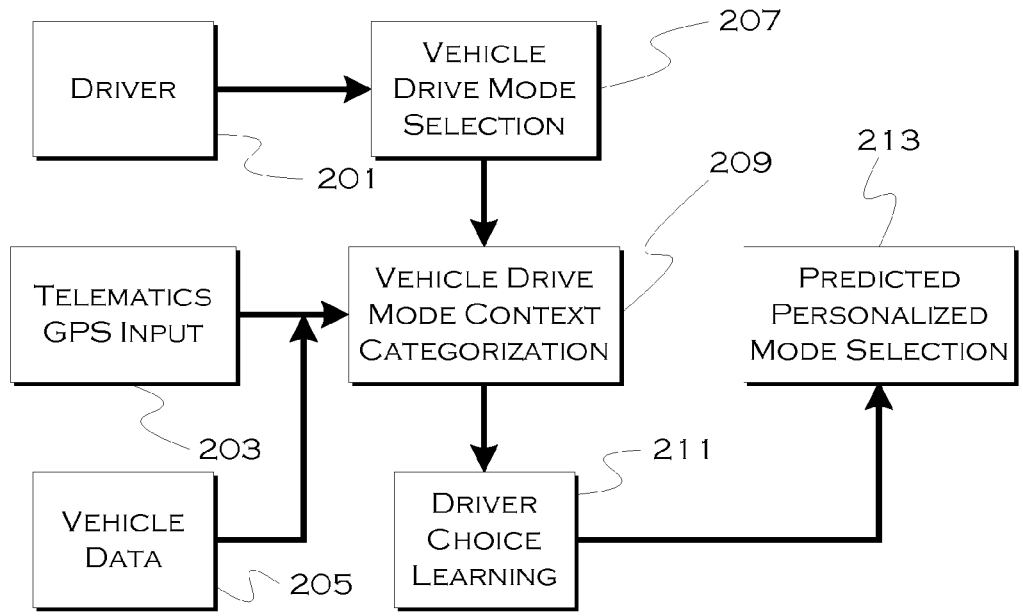
FIG. 2 shows an illustrative driver-behavior learning and prediction system.

FIG. 2 shows an illustrative driver-behavior learning and prediction system. In the illustrative system shown in FIG. 2, there are several inputs into the system. These include the driver 201, the GPS coordinates from the telematics unit 203 and any relevant vehicle data used for context 205.

The driver, in this example, has the ability to change driving modes at any desired time 207. This can be switching to a traction enhanced mode in slippery conditions, a sport driving mode for aggressive handling, a rough-terrain mode for off-roading or gravel/dirt roads, etc. The driver can select whatever handling/driving mode is desired or appropriate for changing road and weather conditions. Different mode selection may be made for the same locations/conditions based on different drivers and their individual preferences. Thus, it is not always possible, using a universal model, to predict what mode a specific driver may desire in a specific situation. While crowd-sourced data or "best guess" analysis may be used to inform a mode-selection decision when limited driver-based data is available for a specific driver, by recognizing the specific preferences of the individual driver over time, more accurate predictions for mode-enablement can be made.

The GPS location input allows for recordation of driving mode selections with respect to specific road/map coordinates. Certain road conditions or driving conditions tend to persist over time at certain locations. If the driver engages a specific vehicle mode to deal with these conditions, chances are that the mode will be desired again at a later time, assuming the conditions persist. If the conditions are fixed or change, a decay factor associated with the predictive learning can allow for the change in the modes to gradually decay to a point where it is no longer automatically enabled when the road portion is encountered.

For example, if a driver engages an off-road mode to deal with a section of road that is covered in pot-holes, the driver may want to engage this mode for as long as the pot-holes persist. Repeated manual engagement of the mode at the same GPS coordinates can be used as a basis for a prediction that this mode is desired for the corresponding GPS coordinates. If the pot-holes are fixed, the driver may either cease manual mode selection or, if automatic mode selection thresholds are met, decline engagement of the automatic mode change. With time, the enablement of the mode at these coordinates will decay with respect to the threshold, until the threshold for automatic enablement is no longer met. If the pot-holes resurface, acceptance of automatic engagement and/or manual engagement will increase the observed instances of mode-enablement, until the threshold is reached again or so that the observed level above the threshold is maintained.

Vehicle data can also be used to augment the decision to automatically engage a driving mode. Known generally as "context," this data can provide a snapshot of environmental driving conditions, occupancy makeup, etc. For example, when children are present in a vehicle, a driver may more frequently engage "conservative" driving modes, that may decrease performance in the interest of more conservative driving. Similarly, when certain weather conditions are present, automatic engagement of a suitable mode, or prevention of engagement of certain performance enhanced modes may be performed.

Using the available inputs, the system can assemble a data repository of vehicle drive mode context categories 209. This can include, for example, driving modes engaged at certain locations and/or driving modes engaged in certain contexts. The data can also represent a combination of location+context, such that at location X, driving mode N is only engaged when context Y is present. Typically, this data will be representative of manual mode engagement decisions made by one or more drivers. Driver identification can also be used to distinguish between various driver preferences at certain locations for the same vehicle. In this manner, a more cautious driver is not subjected to automatic changes based on a more aggressive driver's preferences, when driving the same vehicle at the same location.

Based on the observed driver behavior recorded over time 209, the system can engage in driver behavior learning 211. This will utilize predictive algorithms to "guess" when a driver would typically engage a certain driving mode. Driver selection of driving modes due to road conditions and geometry generally has a high likelihood of recurrence (as these factors typically persist). Mode selections made based on, for example, road geometry, are likely to repeat every time the driver is in the same location in the same vehicle. Based on the frequency of manual mode selection, the locations of mode change/selection by a given driver or all drivers of a vehicle can be identified (known driver identification techniques can be used to distinguish between different vehicle drivers, if desired).

Once the likelihood of a mode selection, determined at least in part based on observed behavior, at a given location, exceeds a tunable threshold, that location may be characterized as a location for a driver-personalized mode change. Environmental information can be used to further inform the prediction, or, in some cases, can be used as the basis for automatic mode enablement or mode prevention (e.g., without limitation, snow mode in snowing conditions at a given location, prevention of sport mode in wet or icy conditions, etc.). The table below shows some exemplary mode selection data that can be used as a basis for understanding the illustrative embodiments.

| Driver Mode Selection | Location | Weather | Temperature | Likelihood |
|---|---|---|---|---|
| Gravel | $GPS_{lat}1, GPS_{long}1$ | — | — | $L_1$ |
| Snow | $GPS_{lat}2, GPS_{long}2$ | Snow | Below Freezing | $L_2$ |
| Sport | $GPS_{lat}3, GPS_{long}3$ | Rain | ~Freezing | 0 |

A driver choice learning algorithm may be run in real-time during vehicle trips, and may update the driver mode selection status. If a driver mode selection is made at a particular location (i), the GPS coordinates of that location may be stored and an initial likelihood is given:

$$L_i(GPS_{lat}, GPS_{long}) = p_0, \; i=1, \ldots, n$$

Where n is the number of locations recognized and $p_0$ is the initial likelihood of the selected drive mode.

In future trips, when the vehicle drives through the similar range of GPS coordinates of $L_i$ and the driver selects the same drive mode, the likelihood is increased such as in:

$$L_{i+1}(GPS_{lat}, GPS_{long}) = \alpha \cdot L_i + (1-\alpha) \cdot p_0, \; i=1, \ldots, n$$

If the driving mode is not selected (or, in at least one case, if automatic selection of the driving mode is reverted or declined), the likelihood becomes:

$$L_{i+1}(GPS_{lat}, GPS_{long}) = \alpha \cdot L_i, \; i=1, \ldots, n$$

Where $\alpha$ is a decaying factor.

In another illustrative embodiment, the likelihood constants may be chosen for $p_0$ in the form:

$$p_0 = \begin{cases} \gamma (\text{Initialization}) \\ \alpha (\text{Update}) \end{cases}$$

Where $\gamma$ is the value during initialization and $\alpha$ is the corresponding update value.

Whenever the likelihood $L_i$ reaches a designated tunable sensitivity threshold, based on driver selection frequency, for example, the corresponding location is regarded as a high-likelihood location for mode change. On the other hand, if $L_i$ drops below the threshold level, the location may no longer be considered a point where mode-change should occur. Information from the driver choice learning system module can be sent to a predicted personalized mode selection module 213.

The predicted personalized mode selection module may provide advanced information about upcoming high demand situations. Whenever the likelihood $L_i$ reaches a designated tunable sensitivity threshold, the corresponding location for the selected drive mode may be noted. Then, in future driving situations, when the vehicle approaches a GPS location identified by the driver choice learning module, the predicted personalized mode module may automatically select the appropriate mode, augmenting the vehicle settings in accordance with the mode. In practice, engagement of a particular mode can be defined based on an aggregate number of mode occurrences or, for example, based on a percentage of mode occurrences. For example, if a low data sample size is available for a given location, at least a certain number of aggregate occurrences may be needed to automatically engage a mode. Of course, selection of engagement criteria is at the discretion of the implementer, and these examples are provided for illustrative purposes only.

Figure 3:
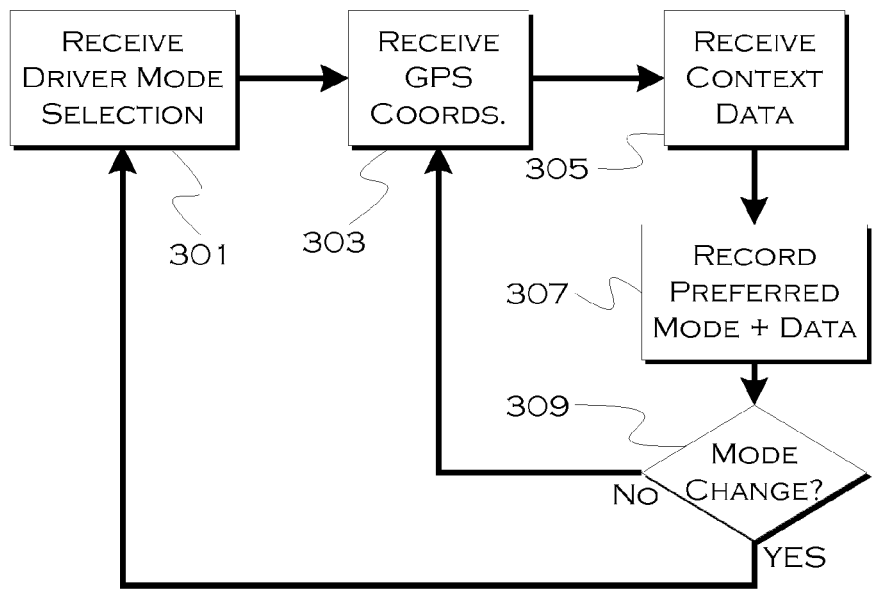
FIG. 3 shows an illustrative learning process.

FIG. 3 shows an illustrative learning process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 3, the process waits until a driver mode-selection is made 301. The vehicle will generally start in either a base-mode or in a mode in which the vehicle was last set. When a manual mode change occurs 301, the process will receive vehicle GPS coordinates 303 and any relevant context data 305. The process can then either record a new instance of the mode setting, or update an existing instance of the mode setting for that coordinate set 307, depending on whether or not the mode was previously observed at that location and/or under the context (if any) received from the vehicle.

As long as the new mode persists 309, vehicle coordinate data and context data can be received and recorded, so that utilization of the mode over a range of GPS coordinates is recorded. Once the mode changes back 309, the process can cease recordation of data (or record data for the new mode), until another mode change is detected. In at least one example, a vehicle has a "base" mode of driving in which the vehicle is generally set. Whenever the current mode corresponds to the base mode, the system can skip recordation of data, since in the absence of data, use of this mode can be assumed. Whenever a non-base mode is detected, the system can record the relevant data for the duration of the utilization of the non-base mode. Thus, if Mode A was the base mode, and modes B and C were alternative modes, then over the sequence Mode A, Mode B, Mode C, Mode A, Mode B, Mode A, the GPS and context data could be recorded for Mode B, Mode C and then Mode B again, respectively, and the data for the instances of Mode A could be ignored.

Data recorded for observed instances of mode changes can be saved with respect to the location in mode:location pairs, or, for example, can be saved with respect to a mode:location:context set. In the mode:location pair model, the mode usage is observed as a binary variable, it is either on or off at a given location. To obtain a higher degree of specificity as to mode prediction and enablement, context can be included. This can help refine the contexts under which a certain mode is engaged.

Assuming that Mode A corresponds to "base" driving mode, Mode B to a sport driving mode, and Mode C to an increased traction driving mode, it may be observed that Mode B is engaged in certain locations only when inclement weather is not present. Further, it may be observed that Mode B is never engaged when children (identifiable through vehicle sensors) are present in a vehicle. Mode C may be engaged at certain locations only when snow or heavy rain is present, and may never be engaged in pleasant weather.

By using context, prediction for conditional behavior can be improved. For example, if a driver drives through location i fifty times, and engages Mode C one hundred percent of the seven times that slippery conditions are present, the driver likely always wants Mode C engaged at that location when slippery conditions are present. But, because there were forty three instances of Mode C not being engaged, a mode:location value may not be above a threshold for mode engagement, because decay would tend to lower the overall usage to a point where it is less than likely that Mode C will be engaged at any random time, for location i. If context (e.g., in this case, slippery conditions) is utilized, however, it can be observed that in the context of slippery conditions, Mode C is utilized one hundred percent of the time. Accordingly, if it is currently slippery the next time the vehicle reaches location i, Mode C can be enabled.

Various types of context can be included in the mode evaluations as is fitting for a given model. Increasing the available context variables will improve the precision with sufficient sample size, but will also tend to provide a wider range of results from which conclusions can be drawn. With insufficient sample sizes, the wide range of results might make any meaningful predictive decisions difficult. Thus, in one example, it is possible to store the mode:location: context data, but to only examine the mode:location data portion of the stored data until at least a meaningful amount (determined by the implementer) of samples have been observed.

Once an apparent correlation of context to the mode is observed, or a disassociation of context to mode is observed (i.e., context appears to have no bearing on mode-engagement), the system can make more informed decisions utilizing context. For example, if context S (slippery conditions) is always present during mode engagement and never present during mode non-selection, then it can be assumed that context M is usable to inform the mode-prediction. On the other hand, if context K (kids present/occupant make-up) is equally (within a tolerance) present during mode selection and mode non-selection, it can be assumed that context K has no bearing on mode prediction. If desired, context related data from a variety of instances of mode-engagement (for all modes or for a particular mode, over multiple, varied GPS coordinate locations) can be used to determine correlations between certain contexts and modes. Thus, even if only limited samples are available for any given coordinate location, but a number of locations have data associated therewith, the system can more quickly draw conclusions about the relevance of a particular context, based on observed behavior at multiple locations in conjunction with a common context (e.g., slippery conditions).

Figure 4:
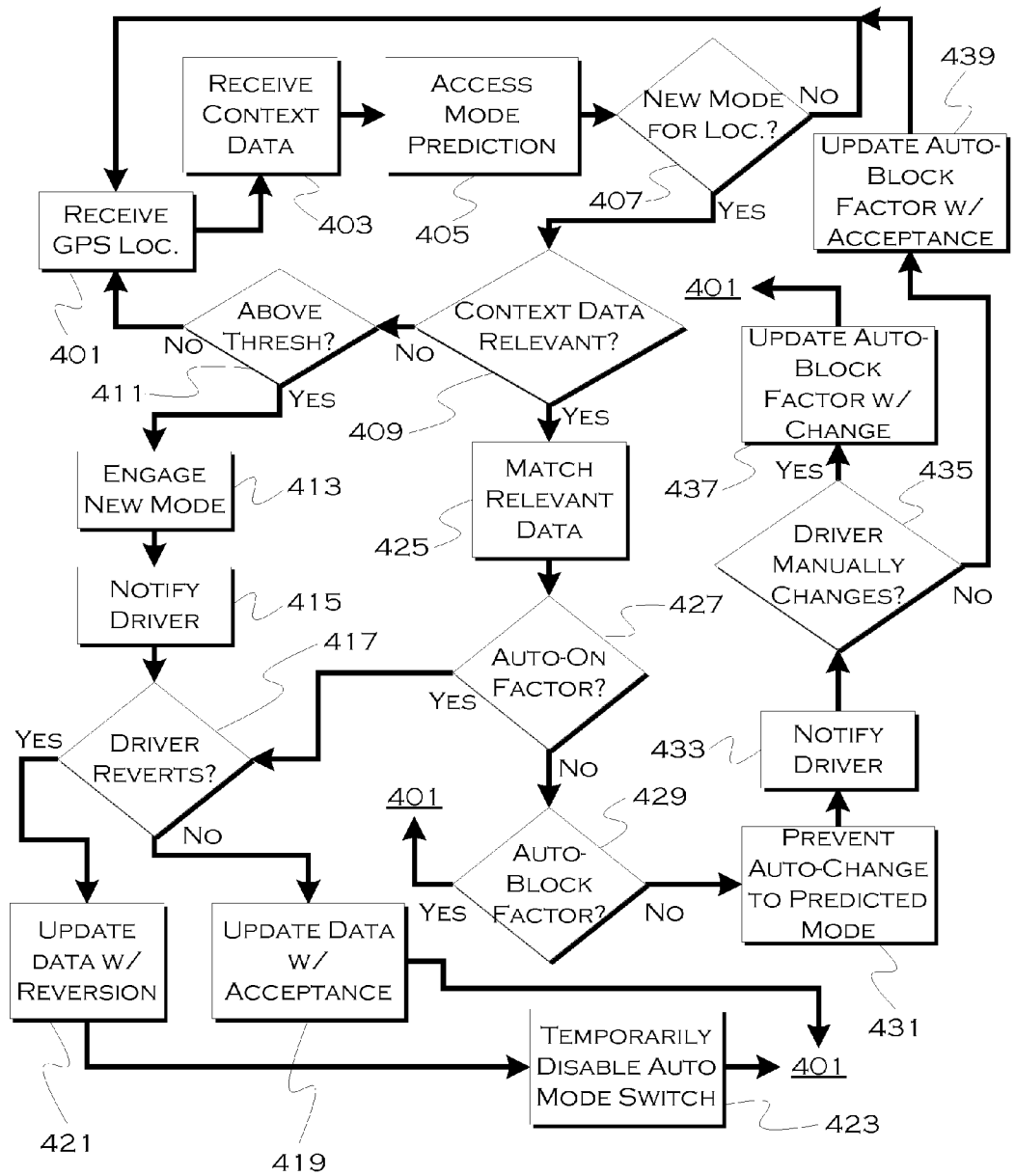
FIG. 4 shows an illustrative predictive driving mode engagement process.

FIG. 4 shows an illustrative predictive driving mode engagement process. With respect to the illustrative embodiments described in this figure, it is noted that a general purpose processor may be temporarily enabled as a special purpose processor for the purpose of executing some or all of the exemplary methods shown herein. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

In the illustrative example shown in FIG. 4, the process will attempt to predictively engage a driving mode (when appropriate). Accordingly, the process receives, in this example, GPS location data 401 and current context data 403. The process then accesses the prediction module 405, to determine if the current location data corresponds to the likely engagement of a new driving mode 407. If the data does not indicate that a new mode should be selected (e.g., without limitation, there is insufficient data, no data above a threshold, or the data indicates maintaining a current mode is desired), the process will repeat for later GPS and context data, until such time as a mode change is predicted.

If the data indicates that past behavior under similar circumstances or at least at a similar location tends to indicate a desired mode change (e.g., observed behavior above threshold), the process then determines if the current context data is relevant for the possible new mode 409. For example, at a given location $i_1$, a single mode could be selected ninety percent of the time, regardless of context. Thus, in this example, context data does not appear to change mode-selection. But, at another location $i_2$, two new modes can be observed as being selected some number of times, each have a different context highly-correlated thereto. Thus, in this example, the context data may be relevant to mode selection.

In a further example of context relevance, certain driving modes may be typically-enabled or typically-prevented (at least with regards to automatic enablement) based on certain contexts. Thus, if the data indicates that Mode B (sport) or Mode C (improved traction) has been observed at a location $i_3$, and Mode B is never automatically engaged in slippery conditions, and/or Mode C is always automatically engaged in slippery conditions, then a context indicating slippery conditions may also be considered relevant for a final decision, whether or not the context was actually observed in the past with respect to the engagement of Mode B or Mode C for that particular location $i_3$.

If the context is determined to have no meaningful bearing on the mode prediction 409, the process will determine if the instances of previously observed mode-enablement rise above the threshold for automatic enablement 411. If not, the process will repeat for a next-GPS-location.

If the observed behavior indicates a likelihood that the mode will be manually enabled 411, the process may automatically engage the predicted mode 413 for the current GPS location. Since there may be a decay factor associated with a failure to manually enable a mode, or since automatic-enablement may count towards mode persistence, but the driver may not actually want the mode any more, this exemplary process will notify the driver that the mode has been enabled 415. In another example, the process may provide the driver with an easily selectable (e.g., one-touch or voice selectable) option to engage the mode.

In this example, the driver has the option to revert to a previous driving mode after the new mode has been enabled. If the driver reverts to the previous mode 417, the process will treat the reversion as an instance of mode non-selection, and may update the data with the reversion 421. In one model, this update is the same as passing the data point without engaging the mode, which is the application of any decay. In another example, because the driver affirmatively de-selected the mode, accelerated decay may be applied, due to the fact that the prediction, for whatever reason, was expressly determined by driver behavior to be incorrect.

In addition to any appropriate decay, the process may also temporarily disable the automatic mode switching option 423. This prevents the system from attempting to once again switch into the non-desired mode at the next coordinate instance. That is, if the driver no longer wanted Mode B over a one mile stretch of road, and the mode prediction occurred every 0.1 miles, the process would avoid attempting to switch into Mode B every 0.1 miles, possibly annoying the driver. Once the designated stretch of continuous Mode B persistence (based on previously observed behavior) had been passed, the process could resume automatic mode change prediction.

Going back to step 409, if context is relevant, for any reason, in this example, the process may attempt to determine which of the context data is useful for the present analysis 425. That is, because different context may matter in different scenarios, a variety of context data may be gathered and provided to the prediction process at any time, even if only some of the context data actually matters for a given situation.

Once the relevant context data has been extracted, the process determines if the context data dictates an always-engage 427 scenario. In one example, when a driver first purchases a vehicle, the vehicle may be configured such that certain contexts always result in engagement of certain drive modes. Thus, for either a particular location, or all locations in general, the occurrence of, for example, a slippery conditions context, may always initially result in engagement of improved traction control, or, for example, may always result in engagement of improved traction control at road locations having known characteristics (e.g., sharp curves, high speed limits, challenging geometries). Thus, in this example, when a current location corresponding to a known characteristic is first encountered (or has been encountered a limited number of times such that observed behavior data is insufficient to make an informed driver-personalized decision), there may be a preset mode change for that location. In other words, even though there is not enough personal driver data to indicate a mode change at that location, the known characteristics initially dictate a mode change, in this example, in conjunction with the slippery condition context.

Although the mode may be automatically changed initially, it may be the case that the driver does not actually want the mode to be changed at that location, regardless of context. Accordingly, in this example, when the mode is automatically changed based on the certain context (and, in this example, certain location), the process can engage in the driver notification/reversion/update process discussed previously. That is, if the driver agrees with the mode-change (i.e., does not revert to the previous mode) the process affirmatively updates the mode change as specific driver-observed behavior. If the driver reverts to the previous mode, the process can decay/or otherwise negatively update the mode change as specific driver observed behavior. In this manner, automatic mode-changing based on certain contexts as set by an original equipment manufacturer (OEM) can still be tailored to suit a particular driver's desires.

Similarly, there may be certain contexts that are pre-set to automatically block a mode change, such as a slippery condition when a sport-mode is predicted. It may be the case that the previously observed context gives no indication of whether a mode is enabled based on presently observed context. For example, in all previously observed instances of reaching the current coordinates, the weather has been pleasant. Thus, while a sport-mode may have always been selected, there is nothing to indicate whether or not such a mode would be selected if the weather created slippery conditions. Accordingly, the OEM may specify initial blocking-contexts for certain mode engagement 429.

As with the automatic-engagement contexts, the automatic-blocking contexts can be tailored with time based on driver preferences. In the example above, if the automatic engagement of a sport-mode is blocked 431 based on the occurrence of the context "slippery conditions," the driver may be notified that the predicted context swap did not occur 433. If the driver manually changes the driving mode to sport-mode anyhow 435, the process can update the slippery condition location:mode:context data for that location 437, so that, with sufficient observation, the sport-mode will no longer be blocked at that location, even in the instance of slippery conditions.

On the other hand, if the driver does not change the mode into sport mode manually, this is assumed as acquiescence of the block, which is taken as an indication that the block is acceptable and that the driver prefers either the base mode or another context-appropriate mode (if a different mode is manually set by the driver). In this instance, the location:mode:context data can be decayed for slippery conditions and sport mode at that location, so that in future instances the correspondence of the context, mode and location is below or remains below the threshold. Additionally or alternatively, acceptance of the auto-block under the given context could be positively updated 439, to confirm/reinforce blocking of sport modes (at this location or at any number of locations) based on the context "slippery conditions."

Of course, it is also possible to always-block or always-engage certain modes under certain conditions, regardless of driver preferences. In these instances, the driver would simply have to manually engage a different mode, if desired. Generally, however, through use of context, location information and observed driver behavior under the contexts and at the locations, it is possible to predict driver mode-changes with a high degree of accuracy, once sufficient data is obtained. The level of what qualifies as "sufficient data" can be set based on an implementer's particular desires and can be as low as a single or a few instances from which further prediction can evolve.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system comprising:
a processor configured to:
access driver-specific driving-mode-change data for a current vehicle location;
determine, based on the accessed data, if a vehicle driving-mode-change at the vehicle location previously occurred sufficiently to cross a predefined threshold ratio of occurrences to number of instances the vehicle was at the vehicle location; and
if the vehicle driving-mode-change occurred more than the threshold ratio, automatically change a vehicle driving-mode to a driving-mode associated with the driving-mode-change.

2. The system of claim 1, wherein the processor is further configured to receive a vehicle context, and wherein the processor is configured to determine if the vehicle-driving-mode change sufficiently occurred previously at the vehicle location, while an aspect of the received context was also present, to cross the predefined threshold ratio, the ratio being occurrences while the context aspect was present to instances the vehicle was at the vehicle location while the context aspect was present.

3. The system of claim 2, wherein the at least one aspect of the received context includes current weather conditions.

4. The system of claim 2, wherein the at least one aspect of the received context includes current occupant make-up.

5. The system of claim 1, wherein the processor is further configured to receive a vehicle context, and wherein the processor is further configured to block a driving-mode change that would otherwise be automatically engaged as a result of the driving-mode-change that previously occurred sufficiently to cross the threshold, the block being based on at least one aspect of the received context.

6. The system of claim 5, wherein the at least one aspect includes a weather condition.

7. A computer-implemented method comprising:
accessing driver-specific driving-mode-change data for a current vehicle location;
determining, based on the accessed data, if a vehicle driving-mode-change at the vehicle location has previously occurred sufficiently to cross a predefined threshold threshold ratio of occurrences to number of instances the vehicle was at the vehicle location; and if the vehicle driving-mode-change occurred more than the threshold ratio, automatically changing a vehicle driving-mode to a driving-mode resulting from the driving-mode-change.

8. The method of claim 7, further including receiving a vehicle context, and wherein the determining includes determining if the vehicle-driving-mode change sufficiently occurred previously at the vehicle location, under at least one aspect of the received context, to cross the predefined threshold.

9. The method of claim 8, wherein the at least one aspect of the received context includes current weather conditions.

10. The method of claim 8, wherein the at least one aspect of the received context includes current occupant make-up.

11. The method of claim 7, further including receiving a vehicle context, and blocking a driving-mode change that would otherwise be automatically engaged as a result of the driving-mode-change that previously occurred sufficiently to cross the threshold, the blocking being based on at least one aspect of the received context.

12. The method of claim 11, wherein the at least one aspect includes a weather condition.

13. A system comprising:
a manual driving-mode control for manual input of a vehicle-driving-mode change;
a processor, in communication with the manual control, configured to:
receive driver input indicating a vehicle-driving-mode change;
receive a vehicle location; and
store an instance of correspondence between the vehicle-driving-mode change and the vehicle location, including update of a likelihood-of-occurrence variable value, representing a present and past receipt of the driver-input indicating a vehicle-driving-mode change at the received vehicle location.

14. The system of claim 13, wherein the processor is further configured to receive vehicle context and to store at least one aspect of the vehicle context with respect to the instance of correspondence, such that the instance of correspondence is between the at least one aspect of the vehicle context, the vehicle-driving-mode-change and the vehicle location.

15. The system of claim 13, wherein the processor is further configured to decay the variable value, indicating an instance of no vehicle-driving-mode change and vehicle location correspondence, when the processor receives a vehicle location, for which a likelihood-of-occurrence variable value was previously updated, without receiving driver input indicating a vehicle-driving-mode change.

* * * * *